US008454216B2

(12) United States Patent
Schug et al.

(10) Patent No.: US 8,454,216 B2
(45) Date of Patent: Jun. 4, 2013

(54) LAMP ASSEMBLY

(75) Inventors: Josef Andreas Schug, Wuerselen (DE); Harald Willwohl, Aachen (DE); Ralph Hubert Peters, Aachen (DE); Wouter Petrus Kaandorp, Best (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 292 days.

(21) Appl. No.: 13/060,711

(22) PCT Filed: Aug. 31, 2009

(86) PCT No.: PCT/IB2009/053786
§ 371 (c)(1),
(2), (4) Date: Feb. 25, 2011

(87) PCT Pub. No.: WO2010/026522
PCT Pub. Date: Mar. 11, 2010

(65) Prior Publication Data

US 2011/0149586 A1 Jun. 23, 2011

(30) Foreign Application Priority Data

Sep. 5, 2008 (EP) .................................... 08105250

(51) Int. Cl.
*F21S 8/10* (2006.01)
*B60Q 1/02* (2006.01)
*F21V 11/00* (2006.01)

(52) U.S. Cl.
USPC ........... 362/548; 362/509; 362/519; 362/538; 362/511; 362/545

(58) Field of Classification Search
USPC .................. 362/509, 511, 519, 538, 545, 548
See application file for complete search history.

(56) References Cited

U.S. PATENT DOCUMENTS

| | | | | |
|---|---|---|---|---|
| 7,316,495 | B2 * | 1/2008 | Watanabe et al. | 362/545 |
| 7,896,532 | B2 * | 3/2011 | Hsu et al. | 362/518 |
| 2007/0133220 | A1 * | 6/2007 | Watanabe et al. | 362/538 |
| 2007/0211487 | A1 | 9/2007 | Sormani | |
| 2010/0002430 | A1 * | 1/2010 | Liou et al. | 362/235 |

FOREIGN PATENT DOCUMENTS

| | | | |
|---|---|---|---|
| DE | 202004010950 | U1 | 10/2004 |
| DE | 102007025337 | A1 | 12/2007 |
| WO | 2004007241 | A1 | 1/2004 |
| WO | 2006033042 | A1 | 3/2006 |
| WO | 2007057818 | A2 | 5/2007 |

* cited by examiner

*Primary Examiner* — Stephen F Husar
*Assistant Examiner* — James Cranson, Jr.
(74) *Attorney, Agent, or Firm* — Mark L. Beloborodov

(57) ABSTRACT

It is provided a lamp assembly (10) for an automotive headlamp, comprising an LED (12) for emitting light rays, a housing (16), to which the LED (12) is detachably connectable, wherein the housing (16) comprises an entrance window (20) assigned to the LED (12), and a guiding element (22) for guiding the light rays passing through the entrance window (20), wherein the guiding element (22) is connected to the housing (16). Since the LED (12) is detachable connected to the housing (16) a defect LED (12) can by exchanged by only exchanging the LED (12) itself without exchanging the whole lamp assembly (10) including the housing (16) and the guiding element (22). Since the correct position of the bright/dark-cutoff may be provided by the entrance window (20) and/or the guiding element (22) only, a misalignment of a newly inserted LED (12) does not affect the correct position of the bright/dark-cutoff. The exchange of a LED (12) is facilitated and without affecting the correct position of the bright/dark-cutoff.

12 Claims, 2 Drawing Sheets

LAMP ASSEMBLY

FIELD OF THE INVENTION

The invention relates to the field of lamp assemblies, which may be used for an automobile headlamp.

BACKGROUND OF THE INVENTION

From US 2007/0211487 A1 a lamp assembly is known, which comprises several light emitting diodes (LEDs) each arranged inside a channel-like guiding element of a housing. The guiding elements guide the emitted light rays to a common reflector. Due to this design a sharp bright/dark-cutoff is provided, so that the risk of blinding an oncoming driver is reduced. Similarly, DE 10 2007 025 337 A1 describes an LED in a recessed cavity and a semi-parabolic reflector for shaping a front beam. DE 20 2004 010 950 U1 describes an active front lighting system with an array of guiding elements, each containing an LED dome package as light source. WO 2007/057818 describes a heat sink with a recess that accommodates the LED and also acts as a guiding element. Since the bright/dark-cutoff can only be achieved by a very precise alignment of the LED to the guiding element in these designs, an unsatisfactory bright/dark-cutoff may result from even a very minor misalignment between a replacement LED and the guiding element.

There is a permanent need to facilitate the exchange of the used LEDs without affecting the correct position of the bright/dark-cutoff.

SUMMARY OF THE INVENTION

It is an object of the present invention to provide a lamp assembly, which facilitates the exchange of the used LEDs without affecting the correct position of the bright/dark-cutoff.

This object is achieved by a lamp assembly for an automotive headlamp, comprising an LED for emitting light rays, a housing, to which the LED is detachably connectable, wherein the housing comprises an entrance window assigned to the LED, wherein the LED comprises an emitting area, which is larger than the area of the entrance window, and a guiding element for guiding the light rays passing through the entrance window, wherein the guiding element is connected to the housing.

Since the light emitting diode (LED) is detachable connected to the housing, for instance by means of a clamping device like a flat spring, a defect LED can be exchanged by only exchanging the LED itself without exchanging the whole lamp assembly including the housing and the guiding element. It is not necessary to exchange parts of the optic system. The exchange of a LED is facilitated and less costly. Since the correct position of the bright/dark-cutoff may be provided by the entrance window and/or the guiding element only, a misalignment of a newly inserted LED does not affect the correct position of the bright/dark-cutoff. The bright/dark-cutoff is decoupled from the exact position of the LED. Thus, it is not necessary to adjust the optical system after the exchange of the LED. Since a new adjustment of the optical system is not necessary the exchange of the LED is facilitated and faster. The correct position of the bright/dark-cutoff is provided from the beginning on and maintained over nearly the whole lifetime of an automobile. This pre-alignment of the optic system can be provided for each LED of several LEDs of the lamp assembly individually to provide a defined shaped bright/dark-cutoff, which may comprise a complex shape and structure. Particularly the lamp assembly can be used for reflection optics, projection optics or a combination of both.

As mentioned above, the LED comprises an emitting area, which is larger that the area of the entrance window and/or the area of the guiding element pointing to the LED. Particularly the ratio r of the emitting area with respect to the area of the entrance window and/or the area of the guiding element pointing to the LED is $1.01 \leqq r \leqq 3.00$, particularly $1.05 \leqq r \leqq 2.25$, preferably $1.10 \leqq r \leqq 1.44$ and most preferred $1.15 \leqq r \leqq 1.21$. Since the area of the LED is greater than the entrance window and/or the area of the guiding element pointing to the LED, the LED can only be arranged outside the entrance window and/or the guiding element. This facilitates the exchange of the LED, since the LED is better accessible. The LED is particularly in touching contact to the housing and/or the entrance window and/or the guiding element. Due to the greater area of the LED with respect to the entrance window and/or the area of the guiding element pointing to the LED, the effective lighting surface is determined only by the shape of the entrance window and/or the guiding element. Irrespectively of the precision of the position of the LED with respect to the entrance window and/or the guiding element, the effective lighting surface is always defined by the inner walls of the entrance window and/or the borders of the guiding element. The position and the alignment of the entrance window and the guiding element are always the same, since only the LED but not the housing comprising the entrance window and the guiding element may be exchanged.

Particularly the housing comprises a reference feature, particularly a recess, for receiving the LED. The LED is particularly press fitted in the recess. This leads to a facilitated design of the housing. The LED particularly protrudes partially from the recess, so that the LED may be easily removed at will.

Preferably the LED is connected to a supporting substrate. For exchanging the LED it is possible to manipulate the substrate only. A direct contact to the LED, which may impair the LED, is prevented. Particularly at least two LEDs are provided each connected to the same supporting substrate. All LEDs may be removed by removing only one part, namely the supporting substrate. Preferably the housing comprises a reference feature, particularly a recess, for receiving the supporting substrate. The LEDs may be press fitted in the recess via the substrate, so that mainly no mechanical forces are applied to the LEDs in assembled state.

Particularly an optical assistance device, particularly a projection lens or a reflector, is provided spaced to the housing, wherein the optical assistance device is connected to the housing via a spacer. Due to the spacer a defined position and alignment of the optical assistance device with respect to the housing is provided, which will not change during the life time. It is not necessary to align an additional projection lens or reflector or the like separately.

Preferably the guiding element comprises a reflector and/or a lens. The guiding element, which is particularly used as collimator, may be part of a reflection system and/or a projection system.

Most preferred a bright/dark-cutoff is provided by the entrance window and/or the guiding element. Particularly the shape and the position of the LED are of less importance for providing the intended bright/dark-cutoff.

The invention further relates to a bending light assembly for illuminating a curve, comprising a lamp assembly, which may be designed as previously described, wherein the lamp assembly comprises several LEDs for different illumination areas, wherein the LEDs are adapted to be switched on and switched off in dependence of a turning angle of a steering wheel of an automobile. When a driver of a car turns the steering wheel of his car for going along a curve, additional LEDs may be switched on for illuminating additional areas in direction of the curve. This leads to a clearer view of the driver at darkness. Particularly traffic signs and dangerous situation at the lane border of the curve may be better recognized by the driver.

Preferably different LEDs are assigned to differently shaped entrance windows and/or differently shaped guiding elements for providing differently positioned and/or differently shaped bright/dark-cutoffs. Since the additional LED should illuminate the lane border the bright/dark-cutoff may be arranged higher without blinding an oncoming driver. The differently shaped entrance windows and/or guiding elements enable a complex shaped illuminated area comprising an individual and irregular shaped bright/dark-cutoff.

BRIEF DESCRIPTION OF THE DRAWINGS

These and other aspects of the invention will be apparent from and elucidated with reference to the embodiments described hereinafter.

In the drawings.

DETAILED DESCRIPTION OF EMBODIMENTS

Figure 1:
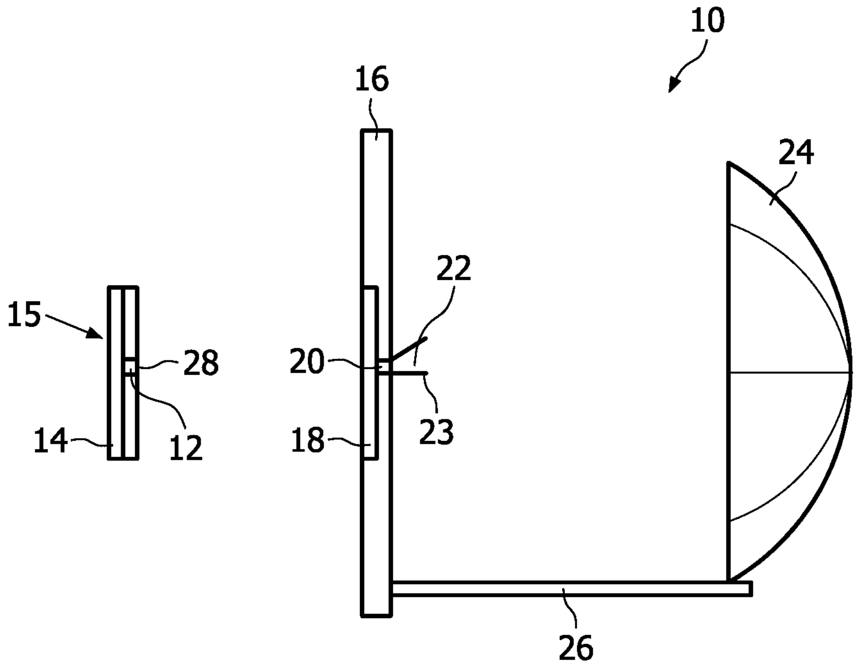
FIG. 1 is a schematic exploded side view of a lamp assembly according to the invention.

The lamp assembly 10 as illustrated in FIG. 1 comprises a LED 12 securely attached to a supporting substrate 14. The LED 12 and the substrate 14 form a LED source assembly 15, which is a single assembly unit. The LED 12 is detachably connectable via the supporting substrate 14 to a housing 16. The housing 16 comprises a reference feature, which is in the illustrated embodiment a recess 18, for receiving the supporting substrate 14 as well as the LED 12. The housing 16 comprises an entrance window 20, through which light rays emitted from the LED 12 may pass. In lighting direction behind the entrance window 20 a collimator 22 for guiding the light rays passing through the entrance window 20 is provided. The collimator comprises a lower border wall 23, which defines the bright/dark-cutoff in the illustrated embodiment. The collimator 22 is securely connected to the housing 16. The light rays guided by the collimator 22 are directed to a projection lens 24, which is securely connected to the housing 16 via a spacer 26. The lower border wall 23 is mainly positioned in the focal plane of the projection lens 24.

Figure 2:
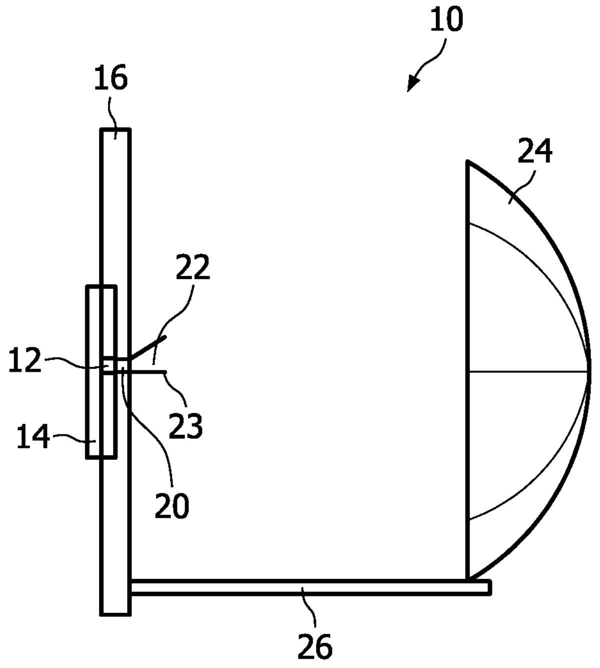
FIG. 2 is a schematic side view of the lamp assembly of FIG. 1 in assembled state.

In assembled state as illustrated in FIG. 2 the supporting substrate 14 protrudes partially from the recess 18, so that the LED may be easily removed. The emitting area 28 of the LED points in lighting direction and covers the whole area of the entrance window 20, so that the entrance window 20 is closed on one side by the LED 12 only. For that reason the area of the emitting area 28 of the LED 12 is greater than the area of the entrance window 20. The area of the emitting area 28 is chosen such that at given tolerances always a part of the emitting area 28 protrudes at every edge of the entrance window 20 and the area of the collimator 22 pointing to the LED 12.

Figure 3:
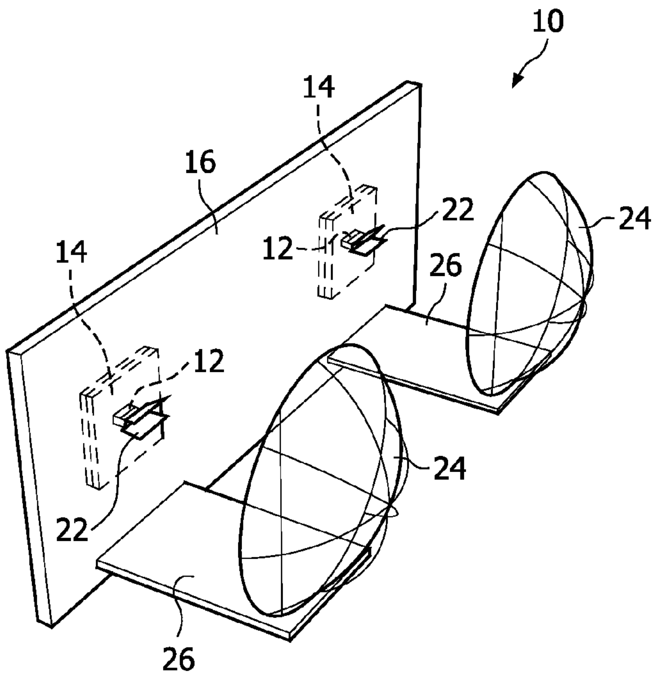
FIG. 3 is a schematic perspective view of the lamp assembly of FIG. 2

As illustrated in FIG. 3 the lamp assembly 10 may or may not comprise more than one LED 12 detachably connected to the same housing 16. The different LEDs 12 may be connected to the same supporting substrate 14. If so, the different collimators 22 and/or the different entrance windows 20 may provide different shaped bright/dark-cutoffs.

Figure 4:
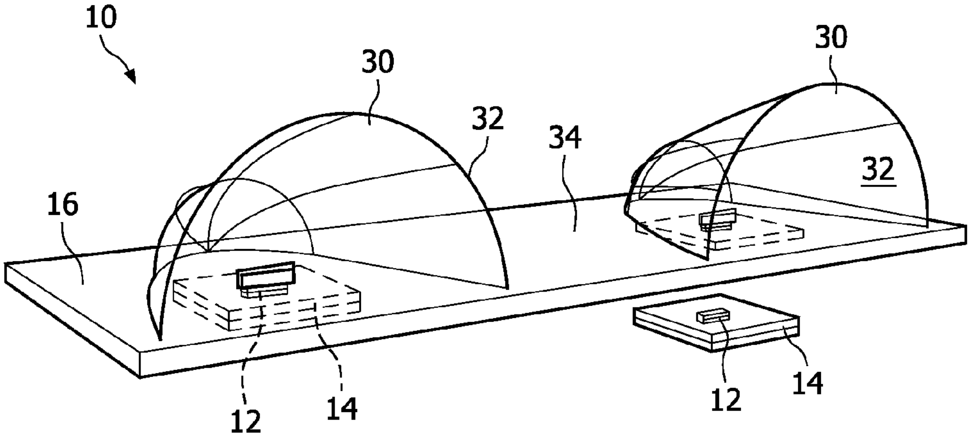
FIG. 4 is a schematic perspective view of the lamp assemble in a further embodiment.

As illustrated in FIG. 4 the lamp assembly can be designed as reflection system, wherein the guiding element is not a collimator 22 but a reflector 30. In the illustrated embodiment the reflector 30 comprises an outlet opening 32 pointing mainly perpendicular with respect to the lighting direction of the LEDs 12 and the entrance window 20. For that reason the reflectors 30 are shaped as half elliptic cone. Due to this design the bright/dark-cutoff is provided by a top surface 34 of the housing 16, wherein the top surface 34 and the reflector 32 border the outlet opening 32.

While the invention has been illustrated and described in detail in the drawings and foregoing description, such illustration and description are to be considered illustrative or exemplary and not restrictive; the invention is not limited to the disclosed embodiments.

For example, it is possible to operate the invention in an embodiment wherein the area of the guiding element 22 pointing to the LED 12 may be smaller than the entrance window 20 and the area of the LED 12. Further the collimator 22 of the projection system illustrated in FIGS. 1 to 3 may be replaced by the reflector 30 of the reflection system and vice versa.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A lamp assembly for an automotive headlamp, comprising a housing defining an entrance window;

an LED light source having a light-emitting area larger than the area of the entrance window, the LED light source being detachably connected to the housing and disposed at least partially therein such that the LED light source is associated with the entrance window and a guiding element connected to the housing for guiding the light emitted by the LED light source and passing through the entrance window.

2. The lamp assembly according to claim 1, wherein the ratio r of the emitting area to the area of the entrance window is $1.01 \leqq r \leqq 3.00$.

3. The lamp assembly according to claim 2, wherein the ratio r of the emitting area to the area of the entrance window is $1.10 \leqq r \leqq 1.44$.

4. The lamp assembly according to claim 3, wherein the ratio r of the emitting area to the area of the entrance window is $1.15 \leqq r \leqq 1.21$.

5. The lamp assembly according to claim 1, wherein the housing defines a recess for receiving the LED light source.

6. The lamp assembly according to claim 1, wherein the LED light source comprises an LED connected to a supporting substrate.

7. The lamp assembly according to claim 6, wherein the housing defines a recess for receiving the supporting substrate.

8. The lamp assembly according to claim 6, wherein the LED light source comprises at least two LEDs connected to a common supporting substrate.

9. The lamp assembly according to claim 1, further comprising an optical assistance device connected to the housing via a spacer.

10. The lamp assembly according to claim 9, wherein the optical assistance device comprises a reflector and/or a lens.

11. The lamp assembly according to claim 1, wherein the guiding element comprises a reflector and/or a lens.

12. A light assembly for a headlamp of an automobile suitable for illuminating a curve, comprising a housing defining a plurality of entrance windows;

a plurality of LED light sources detachably connected to the housing and disposed at least partially therein such that each LED light source is associated with the entrance window, wherein each LED light source has a light-emitting area larger than the area of the entrance window, and a plurality of guiding elements connected to the housing for guiding the light emitted by the LED light sources and passing through the entrance windows, wherein the LEDs are configured to be switched on and switched off depending on a turning angle of a steering wheel of the automobile.

* * * * *